Patented Apr. 5, 1927.

1,623,711

UNITED STATES PATENT OFFICE.

JOHN W. TRIMMER, OF CLEVELAND, OHIO.

METHOD OF TREATING REFLECTORS FOR HEADLIGHTS, ETC.

No Drawing.　　Application filed December 24, 1925.　Serial No. 77,514.

This invention relates to the art of treating reflectors and is concerned more especially with the method of treating reflectors for automobile headlights.

One object of the invention is to devise a method of treating reflectors by which their brilliancy will be controlled.

Another object is to eliminate the objectionable glare of an automobile headlight by treating the reflector with simple mechaical and chemical means.

Another object is to eliminate the objectionable glare of an automobile headlight by inserting a separable mechanically and chemically treated light absorbing and diffusing device, over the lower half of the standard reflector.

To produce the results desired, I treat old brass or copper reflectors as follows:

1st. The reflector is polished.

2nd. The lower half thereof is sandblasted.

3rd. The entire reflector surface is nickel plated in the solution containing:

1 gal. of water.
8 ozs. of nickel salts.
1 oz. of boracic acid.
½ oz. of sodium chloride.
1 oz. of Epsom salts.

4th. The entire reflector surface is silver plated in a solution containing:

1 gal. of water.
7 ozs. of sodium cyanide.
4 ozs. of silver chloride.
½ oz. of ammonium chloride.

5th. The reflector surface is then washed and dried and the upper half thereof polished.

Steel reflectors are subjected to the following process:

1st. The reflector is polished.

2nd. The reflector is copper plated in a solution containing:

1 gal. of water.
4⅓ ozs. of sodium cyanide.
4 ozs. of copper cyanide.
¾ oz. of bicarbonate of soda.
½ oz. of bisulphide of soda.

3rd. It is washed in cold water.

4th. It is copper plated in a solution containing:

1 gal. of water.
1¾ lbs. of copper sulphate.
1 oz. of sulphuric acid.
1 oz. of powdered alum.

5th. It is then dried and buffed, and the lower half thereof sandblasted.

6th. It is then nickel plated and silver plated in the same manner above prescribed for brass or copper reflectors.

In a headlight equipped with a standard polished reflector light rays issuing from the lamp to the lower half of the reflector surface intensify and travel upward above the light beam axis and eliminating objectionable glare. Light rays from the lamp to the upper polished portion of the reflector are reflected and intensified downward below the light beam axis to the ground illuminating the road ahead.

I claim:—

1. The method of treating reflectors comprising polishing the entire reflecting surface, then sandblasting the lower half, then nickel plating the entire surface, then silver plating the same and then polishing the upper half.

2. The method of treating reflectors comprising polishing the entire reflecting surface, then copper plating the same, then sandblasting the lower half, then nickel plating and silver plating the entire surface.

In testimony whereof, I do affix my signature.

JOHN W. TRIMMER.